United States Patent
Sullivan et al.

(10) Patent No.: US 7,256,791 B2
(45) Date of Patent: Aug. 14, 2007

(54) RASTERIZATION OF THREE DIMENSIONAL IMAGES

(75) Inventors: Alan Sullivan, White Plains, NY (US); John T. Snuffer, New York, NY (US)

(73) Assignee: LightSpace Technologies, Inc., Norwalk, CT (US)

( * ) Notice: Subject to any disclaimer, the term of this patent is extended or adjusted under 35 U.S.C. 154(b) by 88 days.

(21) Appl. No.: 10/026,935

(22) Filed: Dec. 18, 2001

(65) Prior Publication Data

US 2002/0085000 A1 Jul. 4, 2002

Related U.S. Application Data

(60) Provisional application No. 60/256,381, filed on Dec. 18, 2000.

(51) Int. Cl.
G09G 5/36 (2006.01)

(52) U.S. Cl. .................. 345/545; 345/546; 345/550

(58) Field of Classification Search ............... 345/545, 345/550, 546, 537
See application file for complete search history.

(56) References Cited

U.S. PATENT DOCUMENTS

| | | | |
|---|---|---|---|
| 5,511,154 A | | 4/1996 | Johnson, Jr. et al. |
| 5,566,280 A | | 10/1996 | Fukui et al. |
| 5,613,048 A | | 3/1997 | Chen et al. |
| 5,706,816 A | * | 1/1998 | Mochizuki et al. ..... 128/660.07 |
| 5,760,781 A | * | 6/1998 | Kaufman et al. ........... 345/424 |
| 5,801,666 A | * | 9/1998 | MacFarlane ................... 345/6 |
| 5,812,136 A | | 9/1998 | Keondjian |
| 5,818,456 A | | 10/1998 | Cosman et al. |
| 5,867,166 A | | 2/1999 | Myhrvold et al. |
| 5,886,701 A | | 3/1999 | Chauvin et al. |
| 5,977,994 A | | 11/1999 | Greenberg et al. |
| 5,982,375 A | | 11/1999 | Nelson et al. |
| 5,990,904 A | | 11/1999 | Griffin |
| 5,995,111 A | | 11/1999 | Morioka et al. |
| 6,016,150 A | | 1/2000 | Lengyel et al. |
| 6,034,674 A | | 3/2000 | Sotheran et al. |
| 6,052,128 A | | 4/2000 | Narayanaswami et al. |
| 6,091,428 A | | 7/2000 | Piazza et al. |
| 6,094,200 A | | 7/2000 | Olsen et al. |
| 6,100,862 A | | 8/2000 | Sullivan |
| 6,144,383 A | | 11/2000 | Lichtenbelt et al. |

OTHER PUBLICATIONS

James D. Foley et al., Computer Graphics: Principles and Practice, 2d ed., c. 1990, pp. 754-756, Addison-Wesley Publishing Co., Inc., USA.

* cited by examiner

*Primary Examiner*—Kee M. Tung
*Assistant Examiner*—Kevin Xu
(74) *Attorney, Agent, or Firm*—Amster, Rothstein & Ebenstein LLP; Abraham Kasdan, Esq.

(57) ABSTRACT

Rasterization of three-dimensional images are provided in which three-dimensional image data, which includes at least (x,y,z) coordinate and color information, are generated, organized, and stored at memory locations in one or more frame buffers in accordance with z-coordinate information.

67 Claims, 13 Drawing Sheets

RASTERIZATION OF THREE DIMENSIONAL IMAGES

CROSS REFERENCE TO RELATED APPLICATION

This claims the benefit of U.S. Provisional Application No. 60/256,381, filed Dec. 18, 2000.

The invention was made with Government support under Contract DAMD17-97-C-7042 awarded by the Defense Administration Research Projects Administration (DARPA). The Government has certain rights to the invention.

BACKGROUND OF THE INVENTION

This invention relates to systems that display three-dimensional images. More particularly, this invention relates to frame buffers and the transfer of image data in such systems.

Conventional three-dimensional ("3D") graphics typically result in two-dimensional images displayed on conventional two-dimensional computer monitors (e.g., cathode ray tubes (CRT), liquid crystal displays (LCD), plasma displays, etc.). The process involves rendering the spatial geometry and corresponding lighting and texture information of a 3D scene (or other 3D object) represented by an image into a relatively small frame buffer. Instructions that describe this rendering are typically generated by a computer (e.g., a personal computer). The instructions are transmitted to a video board typically present in the computer. The video board processes the instructions to convert the 3D scene into pixel data and transfers this data to the display or monitor. Pixel data indicates the location, color, and sometimes the brightness of a pixel. A pixel (i.e., a picture element) is one spot in a grid of thousands of such spots that form an image. It is also the smallest element manipulated by display hardware and software.

Instructions describing an image are often created using an application programming interface (API) such as openGL® or Microsoft's Direct3D®. An API typically describes a scene by defining the spatial geometry, lighting, color, and surface textures of objects in the scene. The geometry may include an array of vertices, or points, each having x, y, and z coordinates, where the z-coordinate represents depth. Each vertex may further include red, green, and blue (RGB) color values, and transparency (alpha) values. Additional arrays may contain lists of vertex indices to describe how the vertices may be combined to form triangles or polygons of x, y, and z coordinates. These triangles or polygons form the fundamental geometric primitives of 3D surfaces, and when used with other triangles or polygons, can describe virtually any two or three dimensional image.

Once generated, API instructions are transmitted to the video board. The video board subsequently performs, if necessary, various transformations, such as geometric (e.g., rotation, scale, or any suitable combination), perspective, or viewport.

After receiving the API instructions and performing any needed or desired transformations, the video board rasterizes the images. Rasterization is the conversion of vector graphics (images described in terms of vertices and lines) to equivalent images composed of pixel patterns that can be stored and manipulated as sets of bits. During rasterization, the color of pixels bounded by the surface primitives (i.e., the triangles or polygons) are computed. In order to perform this computation, conventional algorithms are employed for three-dimensional interpolation of an interior pixel from the RBG values of the vertices. The interpolated values at each pixel location are known as image fragments.

Additionally, if a z value is provided, the video board may remove occluded pixels. A pixel is occluded if it is spatially located behind an opaque pixel. A pixel is located behind another pixel if it is has a higher z value.

If a foreground pixel is not opaque (i.e., the alpha value for the pixel is less than 1), the video board may perform an alpha blend operation. An alpha blend operation blends the RGB values of the overlapping pixels to produce a pixel with a new RGB value that takes into account the alpha contribution of each pixel. In conventional systems, alpha blending involves combining the brightness and/or color values of pixels already in the frame buffer into the memory location of the pixel to be displayed.

To accomplish these operations, a video board typically includes a graphics processing unit (GPU), a frame buffer, and an optional digital-to-analog converter. The GPU receives API instructions from the computer, and performs the above-described transformations and rasterizations. Data from the GPU is then output to the frame buffer. The frame buffer is usually a small capacity memory. Typically, data is stored in the frame buffer based only on the x and y coordinates. After the GPU performs occluded pixel removal and alpha blending, the data is output from the frame buffer to the display. In the case of analog displays, the data may be first converted by a digital-to-analog converter.

Although this arrangement may be adequate for two-dimensional displays, it is inadequate for systems employing three-dimensional volumetric displays and systems that require a large number of three dimensional images to be displayed. In particular, conventional frame buffers are inadequate because they lack the capacity and data organization to store (x,y,z) coordinate image data such that satisfactory three-dimensional images can be displayed.

In view of the foregoing, it would be desirable to be able to provide a frame buffer that has the capacity to store and quickly transfer image data organized such that satisfactory three-dimensional images can be displayed.

SUMMARY OF THE INVENTION

It is an object of this invention to provide a frame buffer that has the capacity to store and quickly transfer image data organized such that satisfactory three-dimensional images can be displayed.

In accordance with this invention, a large capacity frame buffer having image data organized according to z coordinates is provided. Advantageously, the frame buffer can be used in applications requiring a large volume of images to be displayed and is particularly well-suited for three-dimensional volumetric displays, such as that disclosed in U.S. Pat. No. 6,100,862, which is incorporated herein in its entirety.

The frame buffer of the invention allows large amounts of three-dimensional data to be rasterized by assigning a frame buffer memory location to each individual pixel based not only on the pixel's x and y location, but particularly its z location. This allows image data for a particular depth to be located in preferably contiguous storage locations. Such data can then be transferred to image generators or projectors at rates sufficient to produce satisfactory three-dimensional images.

Three-dimensional images are preferably constructed in accordance with the invention by creating the image from a plurality of pixels grouped into sets mapped from two dimensional "slices" of a 3D object. These slices are positioned or layered one after the other to create the three-dimensional image. The three-dimensional image is projected or displayed on a three-dimensional volumetric display that includes a plurality of optical elements or planes.

In one embodiment, the system includes a video controller and a display. The video controller includes a "multiplanar" frame buffer that stores multiple planes of image data. In other embodiments, the display also includes a multiplanar frame buffer. In still other embodiments, the display includes a multiplanar frame buffer and the system includes a conventional video controller with a conventional frame buffer. In yet another embodiment, a non-conventional video controller including a multiplanar frame buffer is integrated with the display. In this last embodiment, the interface between the video controller and the multiplanar frame buffer includes address and data busses.

Pixels within a data set are sorted, stored, and processed on the basis of their x, y, and z locations. The depth (i.e., the z) location is used both to determine which plane (or optionally, which pair of planes, if pixels lying between planes are considered) a pixel will be displayed on and to assign a memory address in the frame buffer to the pixel based in part on the z-value.

In other embodiments, each pixel is assigned both "coarse" and "fine" z values. The coarse z value corresponds to a plane which the pixel will be at least partially transferred, and the fine z value corresponds to the perpendicular offset in the z direction of the point from an adjacent plane (a pixel with a fine z value of 0 is not offset). In other embodiments, the z value is specified as a decimal value, with the integer portion of the value corresponding to the coarse z location (that is, the plane or slice with which the point is associated) and the decimal portion corresponding to the offset. Any other suitable encoding scheme may also be used.

In some embodiments, the data set of pixels corresponding to each two-dimensional plane of the image, together with pixels having a fine z value, are stored in defined memory sections of the multiplanar frame buffer. To display the image, the contents of the multiplanar frame buffer are transferred in blocks to the display frame buffer via a high-bandwidth interface, and are then used to drive the light modulator of the display to present the image as a layered series of two dimensional images. Alternatively, the contents of the graphics processor frame buffer can be used to drive the display light modulator directly. Data may be block-transferred on a pixel-by-pixel, section-by-section (that is, frame-by-frame, or plane-by-plane) or complete image basis.

BRIEF DESCRIPTION OF THE DRAWINGS

FIG. 3b is an illustration of two-dimensional slices of the image of FIG. 3a;

DETAILED DESCRIPTION OF THE INVENTION

Figure 1:
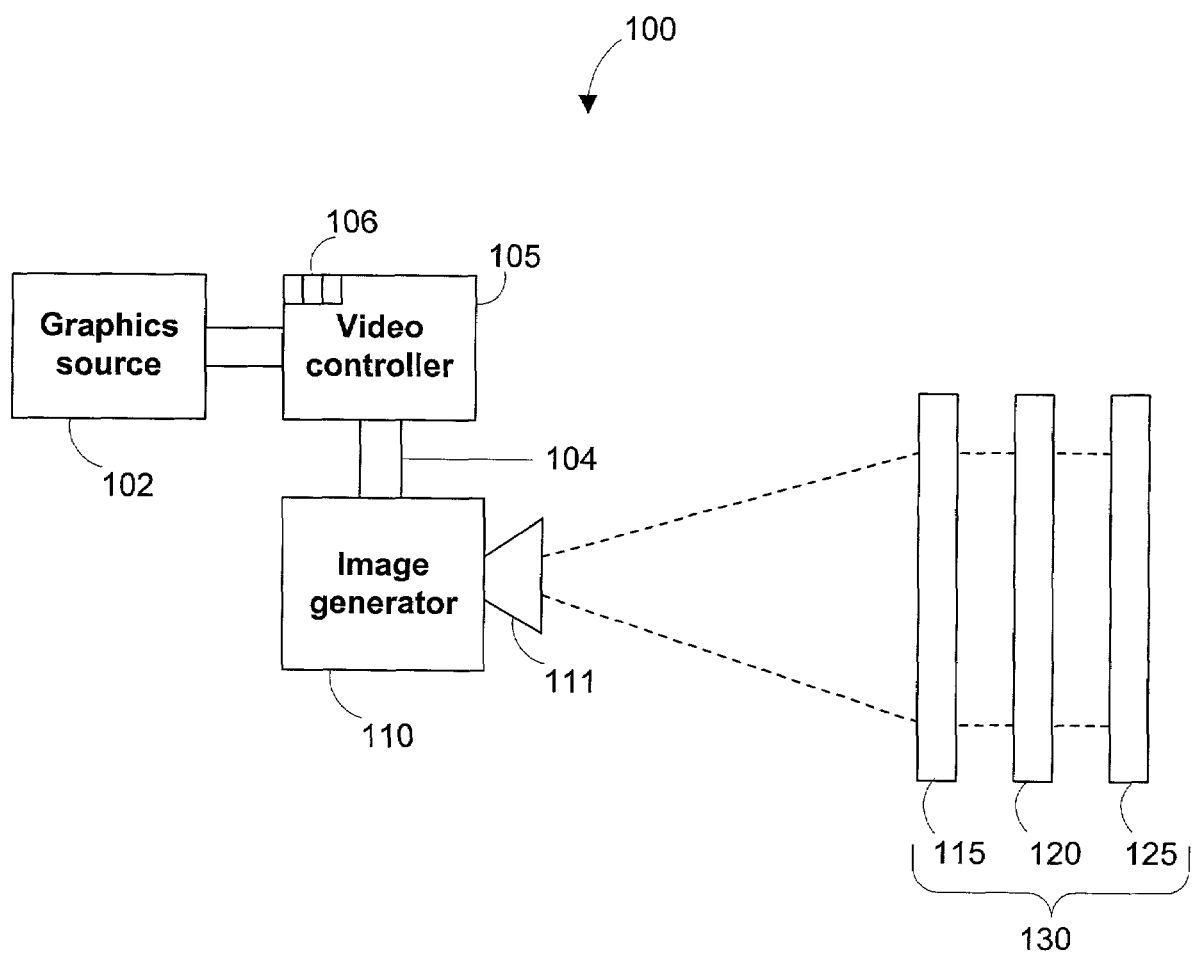
FIG. 1 is a block diagram of an embodiment of a three-dimensional video display system according to the invention.

FIG. 1 shows a multiplanar volumetric display system. Volumetric display system 100 generates three-dimensional (3D) images that are volumetric in nature, that is, the images occupy a definite volume of three-dimensional space and actually exist at locations where they appear. Thus, such 3D images are true 3D, as opposed to an image perceived to be 3D because of an optical illusion created by, for example, stereoscopic methods. Three-dimensional images generated by system 100 can have a very high resolution and can be displayed in a wide range of colors. They therefore have the characteristics associated with viewing a real object. For example, such 3D images may have both horizontal and vertical motion parallax or lookaround, allowing a viewer to change viewing positions and yet still receive visual cues maintaining the 3D appearance of the images.

In addition, a viewer does not need to wear any special eyewear such as stereographic visors or glasses to view the 3D image, which is advantageous because such eyewear is cumbersome and can cause eye fatigue. Furthermore, the 3D image has a continuous field of view both horizontally and vertically, with the horizontal field of view equal to about 360° in certain display configurations. Additionally, the viewer can be at any arbitrary viewing distance from system 100 without loss of 3D perception.

System 100 includes a graphics source 102, a video controller 105, an image generator 110, and a display 130. Graphics source 102 can be any suitable device capable of generating graphical data for use by video controller 105. For example, graphics source 102 can be any of the following: a personal computer operating appropriate graphics generating software; a graphics application program operating an application program interface (API) and a device driver that provides image data in a format appropriate for video controller 105; or any suitable hardware, software, or combination thereof capable of generating appropriate images.

Video controller 105 receives data from graphics source 102 and can be any suitable hardware, software, or any combination thereof capable of performing suitable graphical manipulations. Video controller 105 can be a stand-alone device or it can be integrated with other components of the system.

Figure 2A:
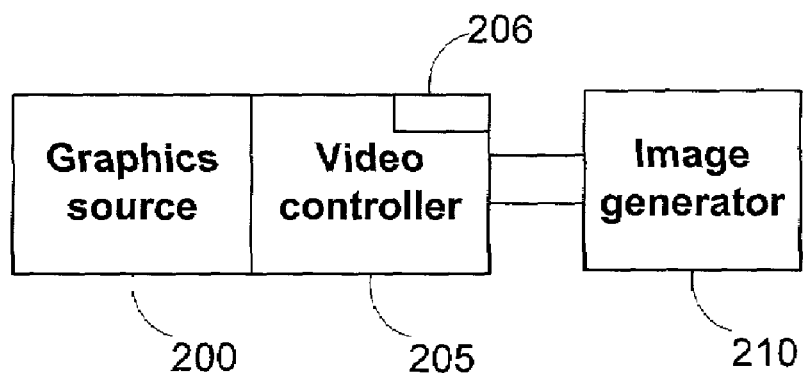
FIG. 2a is a block diagram of another embodiment of a three-dimensional video display system according to the invention.
Figure 2B:
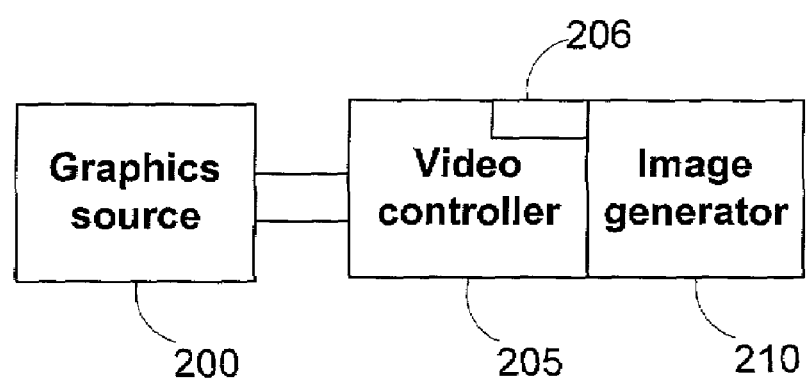
FIG. 2b is a block diagram of a further embodiment of a three-dimensional video display system according to the invention.

In other embodiments, for example, as shown in FIG. 2a, video controller 205 and frame buffer 206 may be integrated with graphics source 200. In other embodiments, as shown for example in FIG. 2b, video controller 205 and frame buffer 206 can be integrated into the image projector 210. In either of the embodiments shown in FIGS. 2a or 2b, video controller 205 and frame buffer 206 may be a stand-alone add-in card, an integrated circuit, or any suitable combination.

Figure 2C:
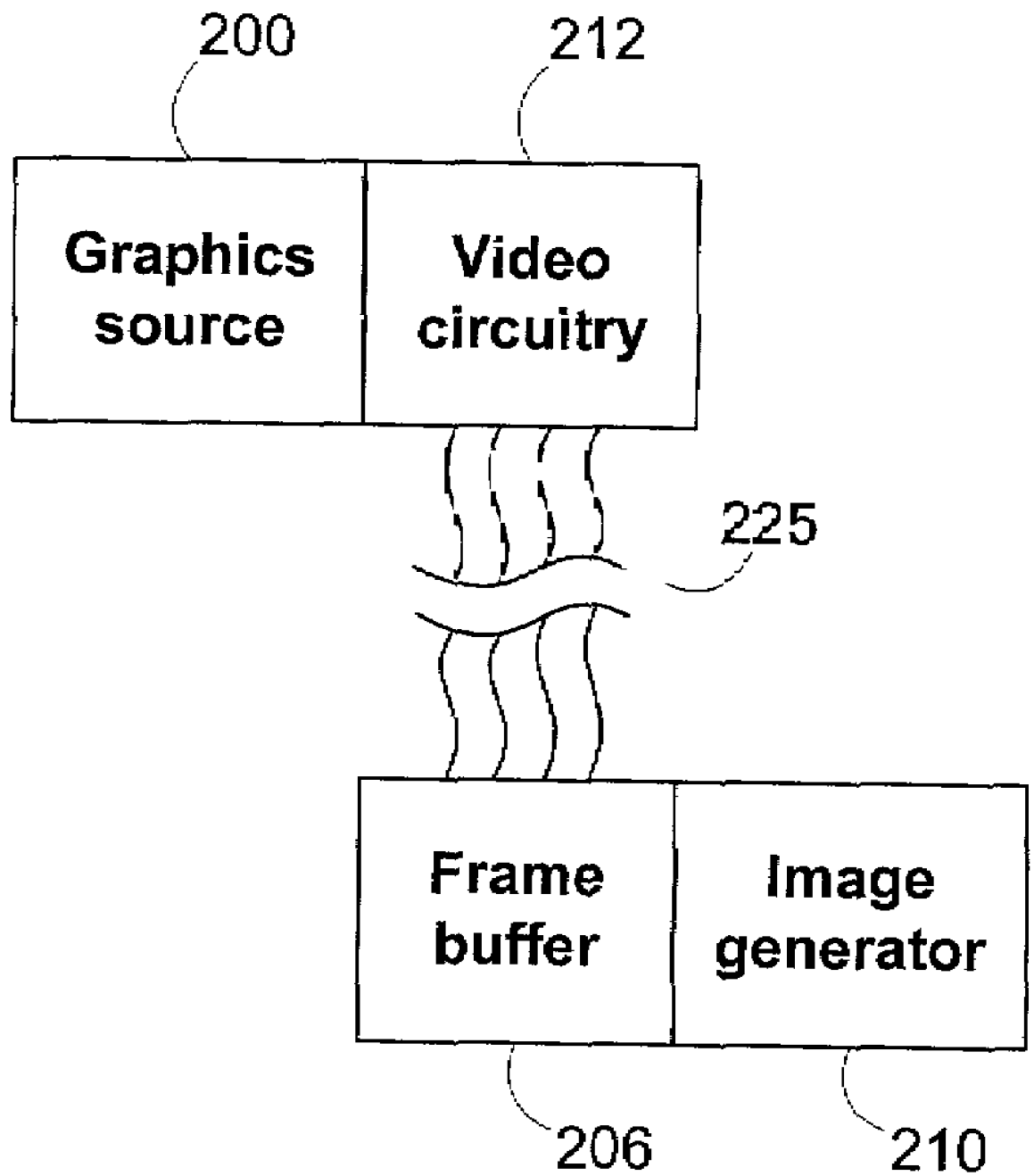
FIG. 2c is a block diagram of a still further embodiment of a three-dimensional video display system according to the invention.

In yet other embodiments, portions of the video controller may be integrated into several components of the system. For example, as shown in FIG. 2c, portions of the video controller, such as video circuitry 212, may be integrated with graphics source 200, while other portions of the video controller, such as multiplanar frame buffer 206, may be integrated onto the image generator 210. In the embodiment depicted in FIG. 2c frame buffer 206 and video circuitry 212 may be interconnected by a high transfer rate connection 225. Connection 225 may be any suitable connection capable of sustaining throughput sufficient to provide a flicker free image generated by image generator 210. In some embodiments, for example, this may require data (whether compressed or not) to be transmitted up to fifty times per second from the frame buffer to the image generator.

Image generator 110 can be any suitable device for generating images based on data received from video controller 105. In some embodiments, the image generator may be a high speed projector for projecting images onto multi-surface optical device 130. In this embodiment, the image projector may include a projection lens 111 for outputting images received from the video controller 105. The projector may also include an adaptive optical focusing system (not shown) for focusing each image of a set of images on respective optical elements 115, 120, or 125. In some embodiments, optical elements 115, 120, or 125 may be liquid crystal elements. An optical element controller (not shown) may also be provided for controlling the translucency of the optical elements such that a single optical element is in an opaque light-scattering state to receive and display a respective image from the image projector, while the remaining optical elements are in a substantially transparent state to allow the viewing of the displayed image on the opaque optical element. Alternatively or additionally, the projector may include a plurality of laser light sources for projecting red, green, and blue laser light to generate and project the set of images in a plurality of colors.

Note that components 102, 105, 110 and 130 of system 100 are shown as separate entities for illustrative purposes only. Alternatively, components of system 100 can be combined in a variety of ways. As already described, graphics source 102 and video controller 105 may be integrated into a single unit. Similarly, image generator 110 and multi-surface optical device 130 may be integrated into a single, stand-alone unit. In other embodiments, optical elements may be self-luminous, which obviates the need for both the image projector and the backlighting of a conventional LCD. In such an embodiment the optical elements may employ electroluminescent elements or organic light emitting diode elements. These electroluminescent elements, or organic light emitting diode elements may be self-luminous and individually addressable. However, any suitable self-luminous elements can also be used. In still other embodiments, components 102, 105, 110 and 130 may be integrated into a single, enclosed unit. In yet another embodiment, the display may be a volumetric display that employs a swept-volume architecture. In such displays, angular slices of a 3D scene are projected sequentially onto a rotating surface.

B. Operation of the System

Figure 3A:
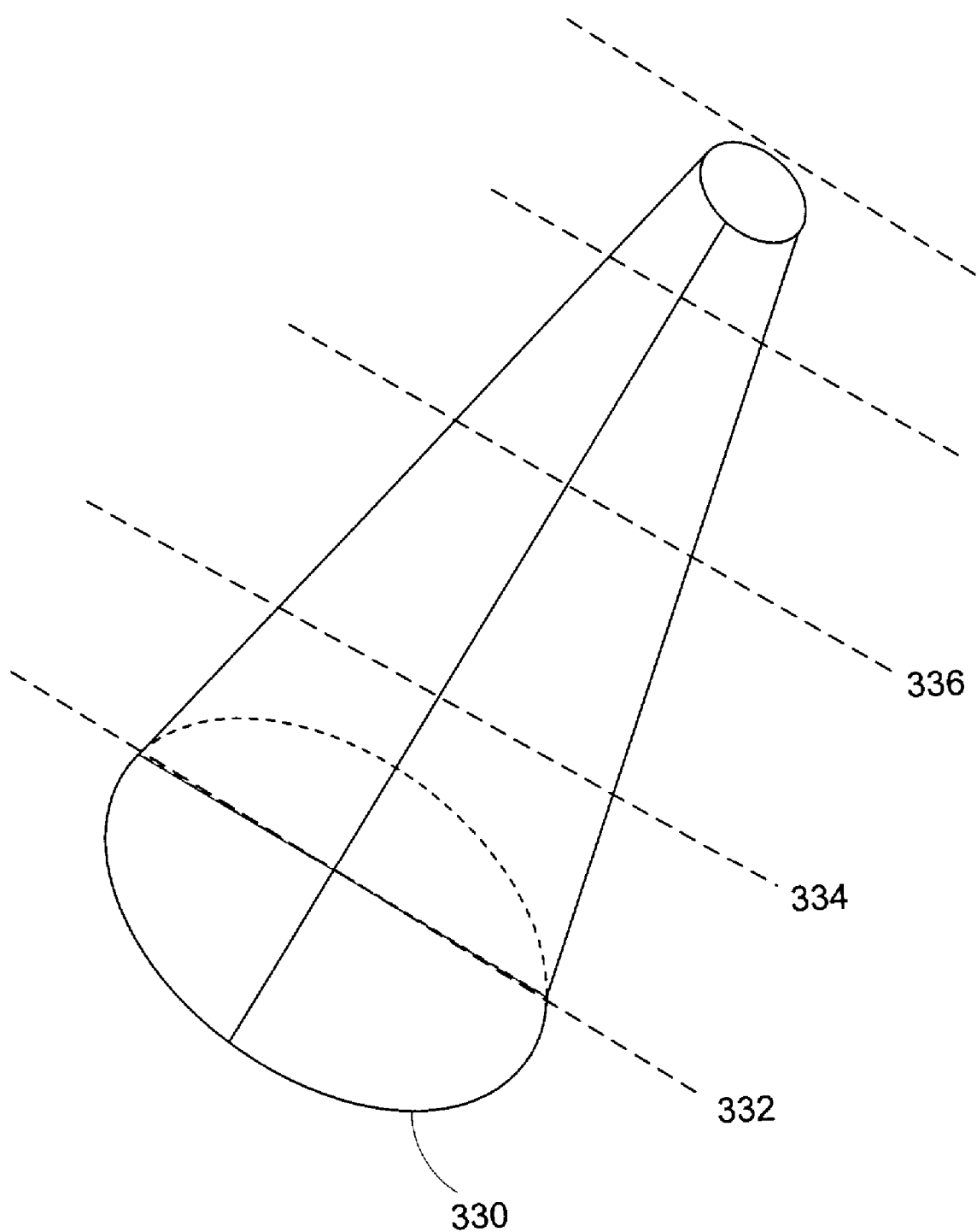
FIG. 3a is an illustration of a three-dimensional image.
Figure 3B:
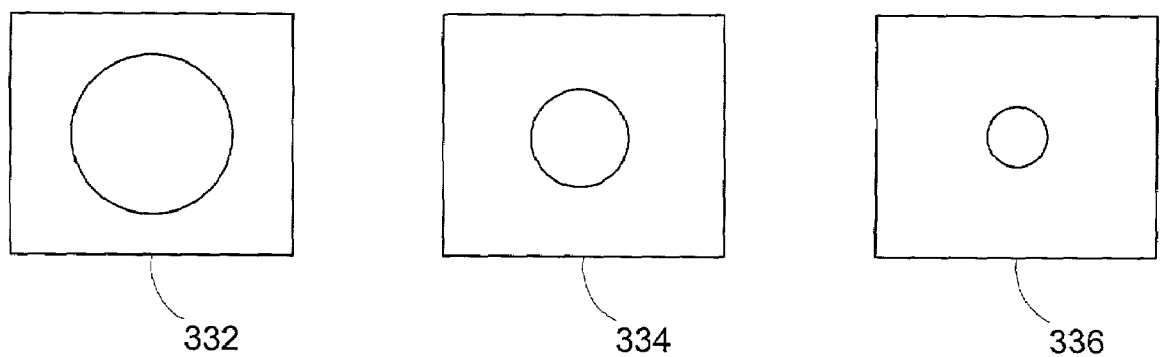

Video controller 105 receives image data from graphics source 102. Image data may include a plurality of two-dimensional "slices" of a three-dimensional image. For example, to display three-dimensional image 330 of FIG. 3a, the graphics source creates image data corresponding to two-dimensional slices 332, 334, and 336 taken at various depths within image 330. Slices 332, 334, and 336 are shown in FIG. 3b. While the number of two dimensional slices can vary, it preferably corresponds to the number of optical elements being used in the system.

This image data is then output from video controller 105 to image generator 110. Image generator 110 selectively projects each two dimensional image onto respective optical elements 115, 120, and 125.

In an embodiment, an optical element controller (not shown) cycles through the optical elements at a high rate selecting one liquid crystal element therefrom to be in the opaque light-scattering state during a particular imaging cycle, and to cause the opaque light-scattering state to move through the liquid crystal elements for successively receiving a respective image from the set of images.

Image generator 110 projects the set of images onto multi-surface optical device 130 at a rate preferably greater than 35 Hz to prevent human perceivable image flicker. That is, each image is preferably projected at a rate greater than about 35 Hz. This requires an image projector to operate at a rate of N times the image rate, where N is the number of optical elements used in the system. For example, if 50 optical elements are used with an image projection rate of about 40 Hz, the image projector operates at a rate of 2 kHz. By projecting the above two-dimensional slices onto multi-surface optical device 130, a volumetric three-dimensional image is achieved.

C. Video Controller

1. Structure

Figure 4A:
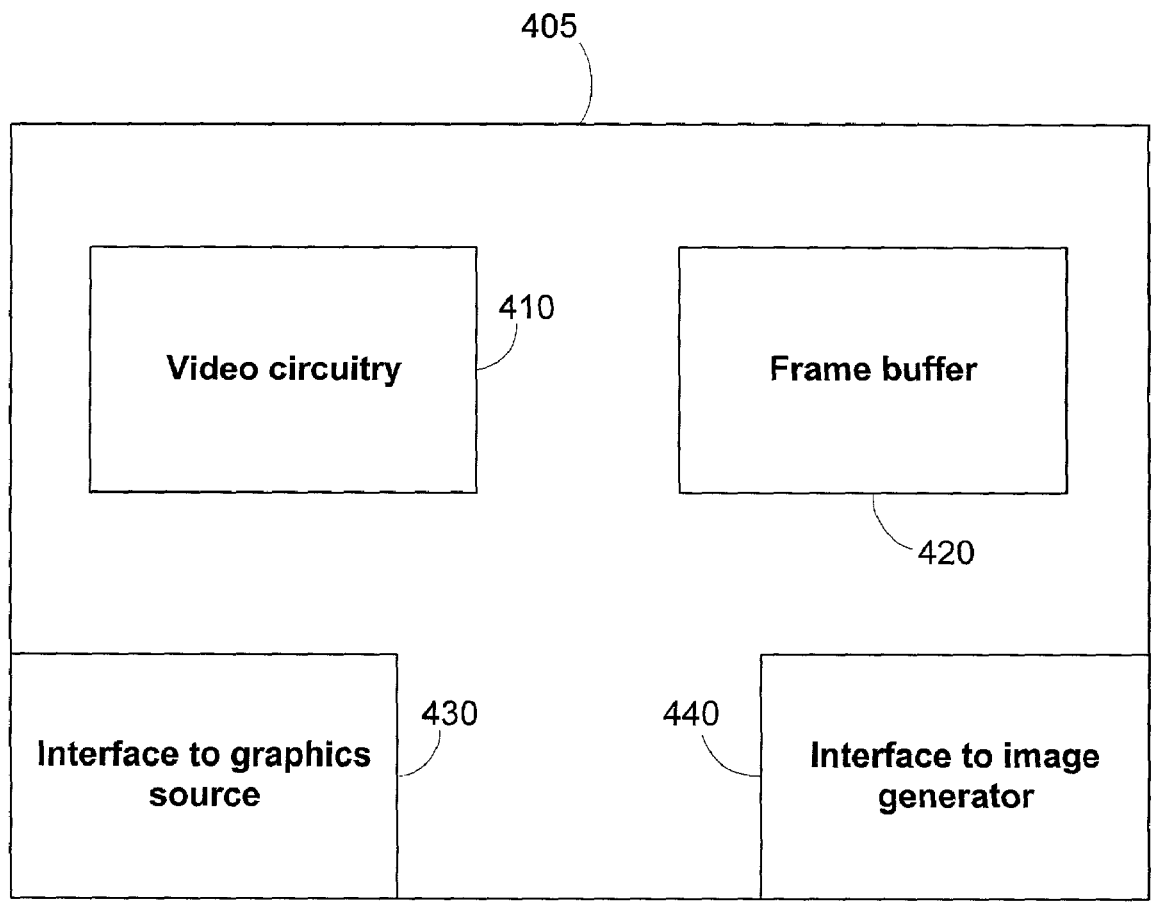
FIG. 4a is a block diagram of an embodiment of a video controller according to the invention.

FIG. 4a, shows a video controller 405 in accordance with an embodiment of the invention. As discussed above, video controller 405 may be a video board, which may be inserted into a suitable graphics source (e.g., a personal computer). Video controller 405 also may be integrated with a graphics source, other circuitry, or both. For example, video controller 405 may be integrated onto the motherboard of a personal computer.

On a broad level, video controller 405 includes an interface 430 to graphics source 102, an interface 440 to image generator 110, video circuitry 410, and frame buffer 420. Interface 430 may be any suitable interface. Interface 430 may be, for example, a personal computer interface (PCI), an accelerated graphics port (AGP) interface, a VME backplane interconnection bus system now standardized as the IEEE 1014 standard, a small computer system interface (SCSI), a NuBus high-performance expansion bus system used in Apple Macintosh, an industry standard architecture (ISA) interface, an extended ISA (EISA) interface, a Universal Serial Bus (USB) interface, a FireWire bus interface now standardized as the IEEE 1394 standard offering high-speed communications and isochronous real-time data services in computers, as well as other open or proprietary interfaces.

Interface 440 may be any suitable interface between display system 100 and display equipment with suitable bandwidth for sustaining a flicker free image.

Video circuitry 410 may include any suitable circuitry for managing or manipulating data received from graphics source 110 and for transmitting the data to frame buffer 420. Video circuitry 410, for example, may be suitable proprietary hardware, or may be any suitable commercially available GPU. It may be a graphics application program of a computer that operates an API, or any other suitable hardware, software, or combination thereof.

Frame buffer 420 is preferably an array of storage devices, such as random access memory (RAM), that store information for each pixel to be displayed. The information preferably includes for example, coordinate (x,y, and z) information, and optionally color (e.g., red, green, and blue) information, chrominance information, luminance information, alpha (transparency) information, or depth (z information) for each pixel, (collectively, "pixel data"). Frame buffer 420 may be any suitable storage device for storing pixel data. For example, frame buffer 420 may be static RAM (SRAM), dynamic RAM (DRAM), extended data output RAM (EDORAM), video RAM (VRAM), window RAM (WRAM), multitask DRAM (MDRAM), synchronous graphics RAM (SGRAM), or any other suitable magnetic, electromagnetic, electrooptical, magnetooptical, or other storage medium.

Figure 4B:
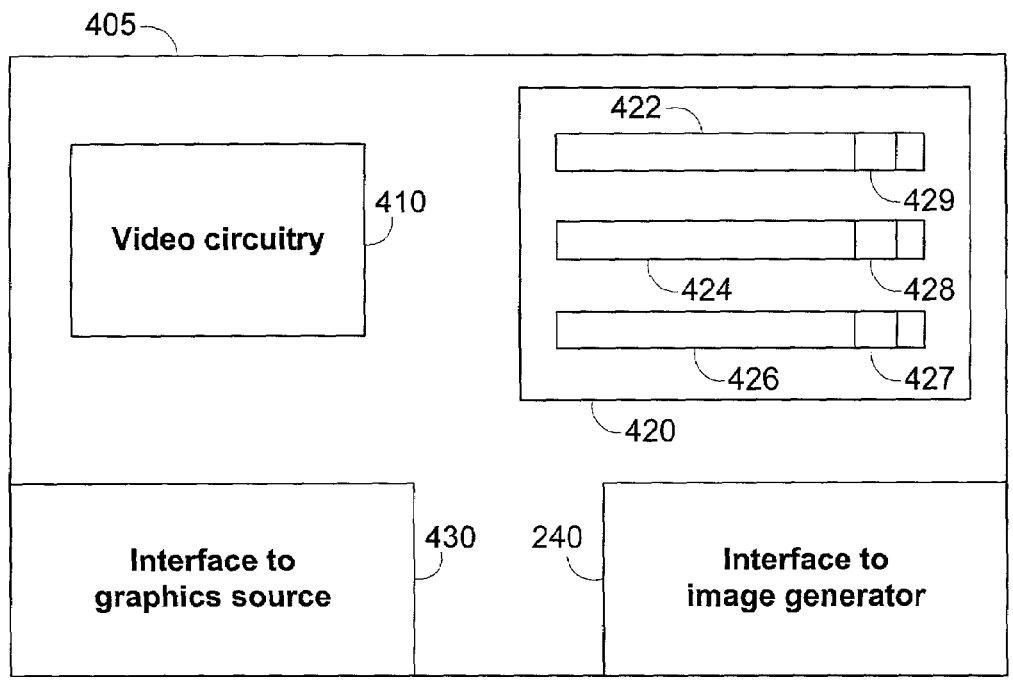
FIG. 4b is a block diagram of an embodiment of a frame buffer according to the invention.
Figure 4C:
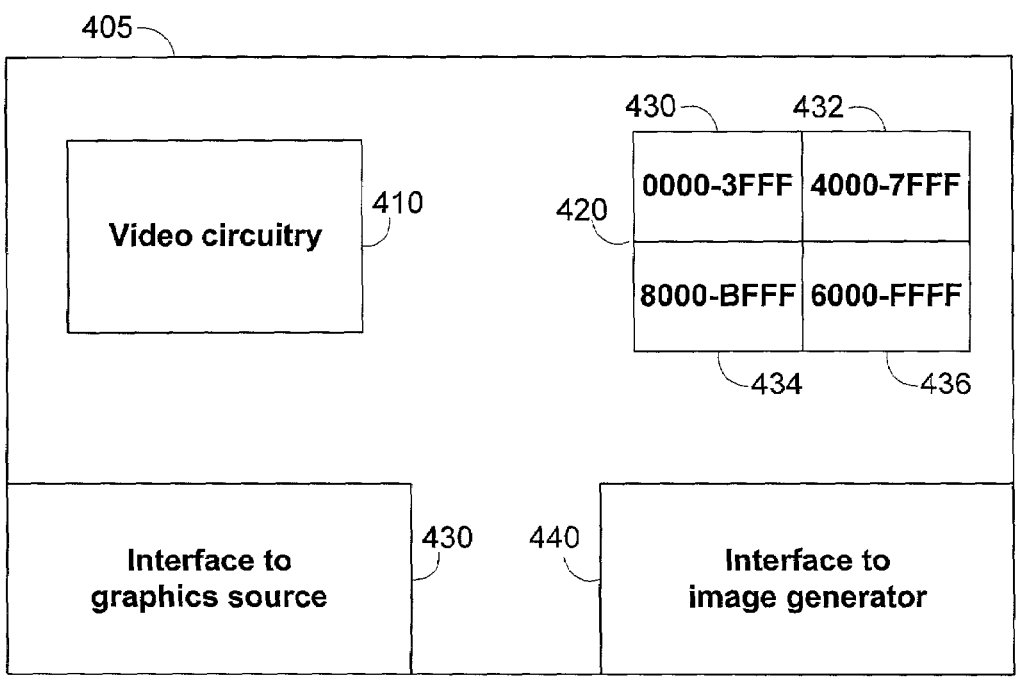
FIG. 4c is a block diagram of another embodiment of a frame buffer according to the invention.

In some embodiments, more than one frame buffer may be used. In these embodiments, pixels that are to be displayed on a common optical element may be stored in a common frame buffer or common segment of a frame buffer. For example, the system may include a separate frame buffer for each optical element (e.g., optical elements 115, 120, and 125) of the system. In this embodiment, the frame buffers may be substantially the same size. The separate frame buffers may be logically or physically delineated. For example, as shown in FIG. 4b, each frame buffer occupies a separate physical storage device 422, 424, and 426. In another embodiment, shown in FIG. 4c, each frame buffer may occupy the same physical storage buffer 420, but be logically delineated by assigning memory ranges 430, 432, 434, and 436 to each frame buffer. Such an assignment may be accomplished statically or dynamically, on an as-needed basis according to memory load.

2. Operation of the Frame Buffer

The frame buffer in some embodiments of the present invention may operate in several alternative modes. In some embodiments these modes may include a projection mode, a multi-pass rendering mode, and a direct rasterization mode. The following will describe each of these modes.

A. Projection Mode

Broadly speaking, it may be desirable to use projection mode in applications where the display employs its own multiplanar frame buffer and/or when it is desirable or unavoidable to use a conventional video controller using a two dimensional frame buffer or single planar frame buffer. Using this method, each image to be displayed is processed and output to the multiplanar frame buffer. The multiplanar frame buffer subsequently performs additional operations on the received data, and displays the data as a three dimensional image made up of a series of discrete, two dimensional images. Accordingly, in this mode, a conventional graphics source 102 and conventional video controller 105 may be employed.

1. Assigning Memory Locations in the Multiplanar Frame Buffer

Figure 5A:
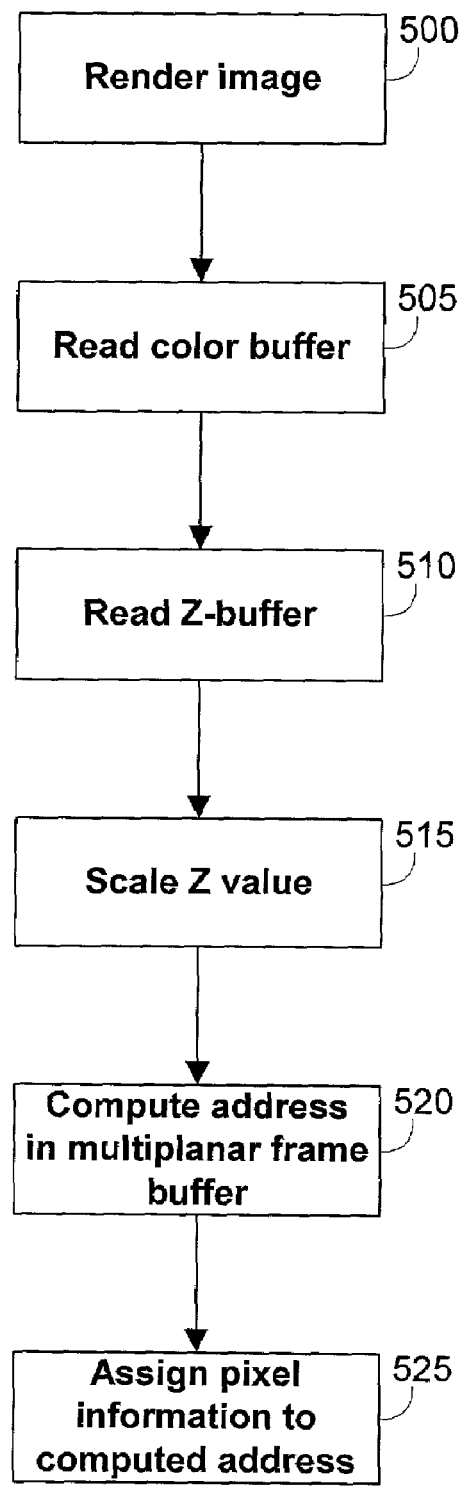
FIG. 5a is a flow diagram of an embodiment of assigning memory locations in a frame buffer according to the invention.

FIG. 5a shows a method of assigning memory locations in a multiplanar frame buffer in accordance with embodiments of the invention. At step 500, the image to be displayed is generated by video circuitry 410. During this step, pixel data for the 2D image is computed based on the API instructions generated by graphics source 102. The data for each pixel in the 2D image includes both color (e.g. red, green and blue) and depth (z-coordinate) information. In some embodiments, the z value is a floating point number ranging from 0.0 to 1.0. In steps 505 and 510, color and depth information is read for each pixel in the 2D image. The z value for each pixel is scaled, in step 215, to a value within a range equal to the number of optical elements (e.g., from 0 to the number of optical elements-1). The scaled z-value is then used in step 520 to compute an address in multiplanar frame buffer 420 at which to store the corresponding pixel data. The color value (and, if relevant, the alpha value) of the pixel is then assigned, in step 525 to the memory location of the frame buffer 420 calculated in step 520.

The scaling operation used in step 515 may be any suitable scaling operation. In one embodiment, for example, the z value may simply be multiplied by the number of picture elements. However, any suitable scaling function that produces a single-value is acceptable. In other embodiments, a pixel having a location on a VGA resolution (e.g., 640×480) display with x, y, z may be calculated using the function:

$$\text{Addr}=N_{b/p}*(x+640*y+640*480*z_i)$$

where $N_{b/p}$ equals the number of bytes of information stored for each pixel, and $z_i$ is the integer portion of the scaled z value derived in step 515.

In yet other embodiments, such as, for example, when the display has a swept-volume architecture, data may be stored in the multiplanar frame buffer using an alternative algorithm. In such systems, it may be desirable to address portions of the screen using cylindrical coordinates (i.e., r, y', and θ), rather than Cartesian coordinates (i.e., x, y, and z). Accordingly, in embodiments of the invention that employ swept-volume architectures, the multiplanar frame-buffer memory may be read out according to cylindrical, rather than Cartesian, coordinates. Cylindrical coordinates may be expressed as Cartesian coordinates using the known transformations:

$$x=r*\text{cosine }(\theta),$$

$$y=y',$$

$$z=r*\text{sine }(\theta)$$

Memory locations in the multiplanar frame buffer may therefore be assigned in such embodiments using the following equation:

$$\text{Addr}=N_{B/P}*(r*\text{cosine}(\theta)+N_r*y'+N_r*N_{y'}*r*\text{sine}(\theta))$$

where $N_{B/P}$ is the number of bytes of information stored for each pixel, $N_x$ is the number of pixels in the frame buffer in the x-dimension and $N_y$ is the number of pixels in the frame buffer in the y-dimension. In yet another embodiment, pixel data are assigned memory locations in the multiplanar frame buffer and are converted to cylindrical coordinates prior to being displayed.

2. Anti-aliasing, Hidden Surface Removal, and Alpha Blending

In another aspect of projection mode, multiplanar anti-aliasing is provided. When an image is projected or displayed on a volumetric display, diagonal or curved surfaces in the z direction may appear jagged and discontinuous. This may be the result of a number of factors. For example, the generated image may have been undersampled or the display may have an insufficient number of optical elements. Multiplanar anti-aliasing smooths out the jagged or sharp edges, producing a smoother rendered appearance in the z direction. Using multiplanar anti-aliasing, the fractional portion of the scaled z value ($z_f$) may be used to compute color values for pixels in adjacent picture elements.

Figure 5B:
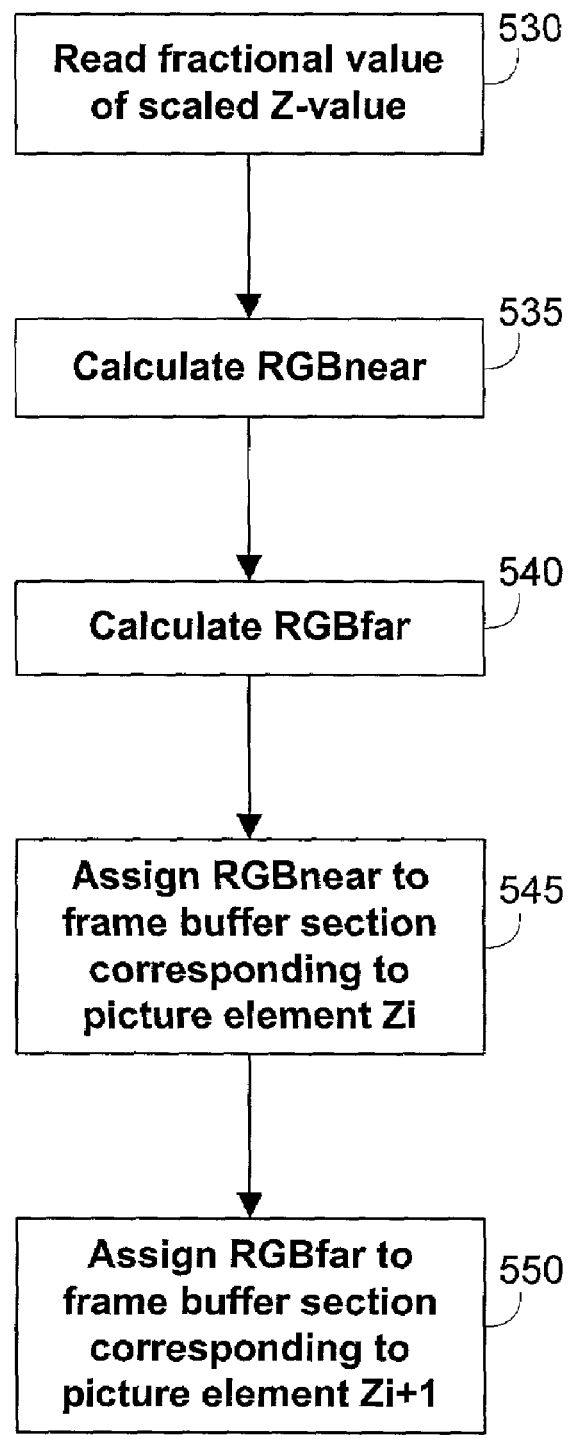
FIG. 5b is a flow diagram of an embodiment of multiplanar antialiasing according to the invention.

FIG. 5B shows a method of multiplanar anti-aliasing in accordance with embodiments of the invention is shown. At step 530, the fractional value of the z scaled value ($z_f$) is read. At steps 535 and 540, the $z_f$ value is used to calculate two color values, $RGB_{near}$ and $RGB_{far}$. The $RGB_{near}$ value is calculated by multiplying the RGB value for that pixel by $(1-z_f)$, while the $RGB_{far}$ value is calculated by multiplying the RGB value for that pixel by $z_f$. In steps 545 and 550 $RGB_{near}$ and $RGB_{far}$ are assigned to the frame buffer sections corresponding to $z_i$ and $z_{i+1}$, respectively. Other such methods for accomplishing multiplanar antialiasing are described in U.S. application Ser. No. 09/291,315, filed on Apr. 14, 1999, now U.S. Pat. No. 6,377,229 (hereinafter "the '229 patent") which is hereby incorporated by reference in its entirety.

3. Transferring the Rendered Data to the Multiplanar Frame Buffer

As discussed above, when using projection mode, a standard video controller can be used with a multiplanar frame buffer residing in the display. This requires additional steps when transmitting image data from the video controller to the multiplanar frame buffer. The additional steps depend on the type of system and hardware being used.

Figure 6A:
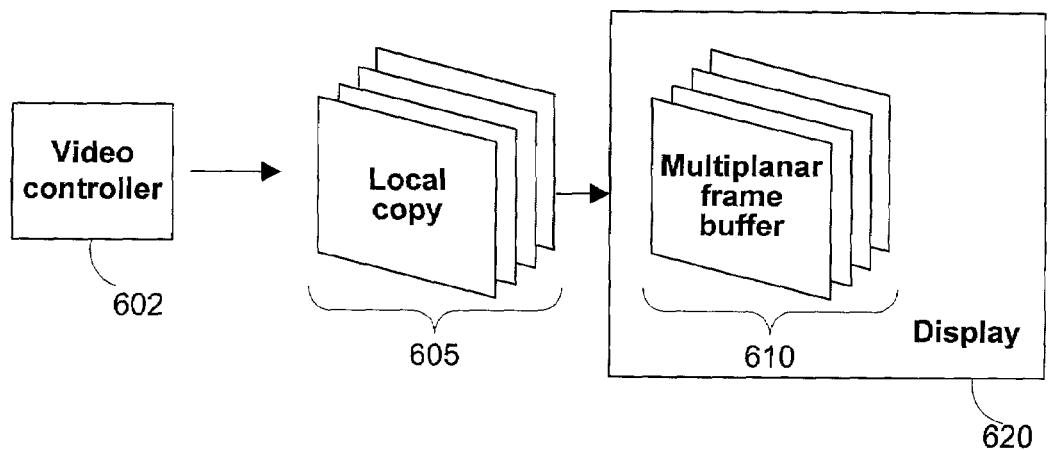
FIGS. 6a-f are diagrams of various embodiments of transferring pixel data to a display according to the invention.

In one embodiment, all processing is done on the data prior to transferring it to the display. As shown in FIG. 6a, once the data has been generated by video controller 602, it is transferred into a local copy 605 of a multiplanar frame buffer 610. Local copy 605 can be implemented in main memory located on graphics source 102. Alternatively, if video controller 105 has a sufficiently large amount of memory, local copy 605 can be implemented on the video controller. Once local copy 605 has been filled, the data may be block transferred to multiplanar frame buffer 610.

Figure 6B:
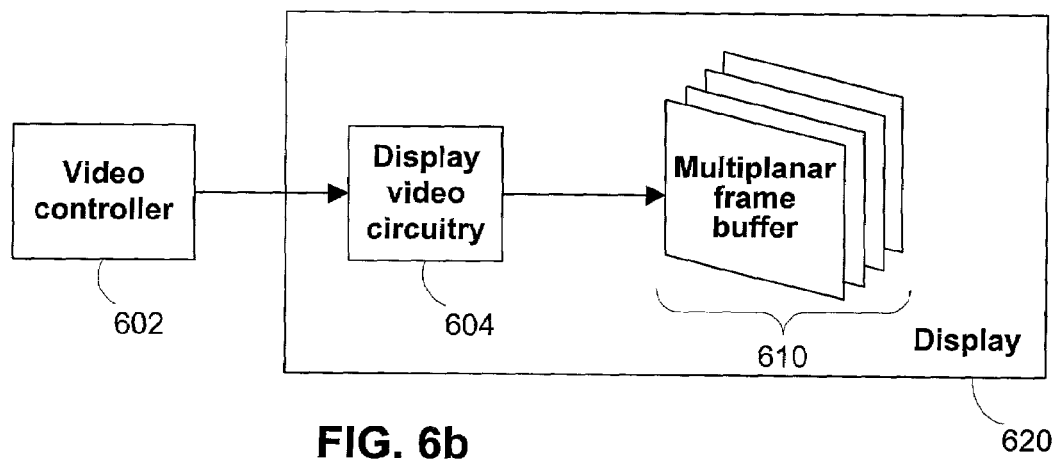

In another embodiment, the display may also incorporate display video circuitry 604 in addition to incorporating a multiplanar frame buffer 610. The display video circuitry can be similar in structure to video circuitry 410. As shown in FIG. 6b, once image data for a single 2D image has been generated, it is transferred to display video circuitry 604 located in the display. Further processing is carried out by display video circuitry and the processed data is transferred to multiplanar frame buffer 610.

Figure 6C:
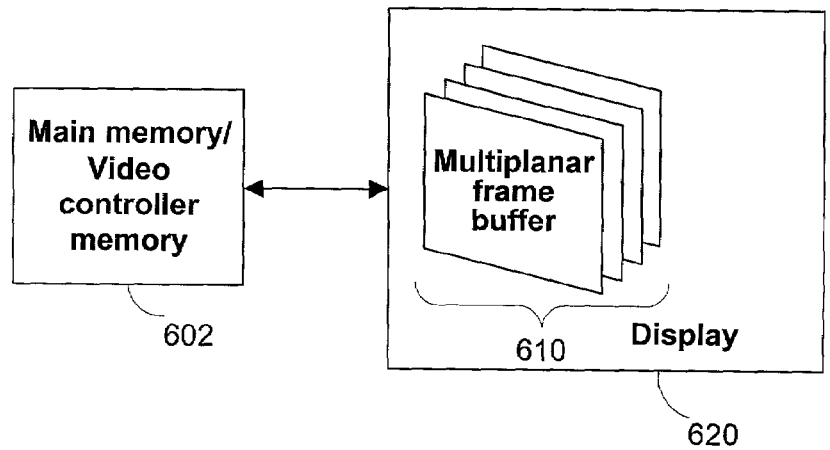

Yet another embodiment is shown in FIG. 6c. In this embodiment, multiplanar frame buffer 610 is located in the display and is memory mapped to video controller 602. Processing is then done on a pixel-by-pixel basis and transferred directly to multiplanar frame buffer 610.

B. Multi-Pass Rendering

In another embodiment of the invention, the multiplanar frame buffer is filled using a multi-pass rendering technique. This technique can be used in systems where a multiplanar frame buffer is integrated into the display, and a conventional video controller with a small memory space is used.

With this approach, a scene is rendered by the computer once for each optical element of the multiplanar display. Multi-pass rendering allows multiple image surfaces to be visible at different viewing angles within the display. That is, there are no "missing" parts of the image when viewed from off-axis.

Figure 5C:
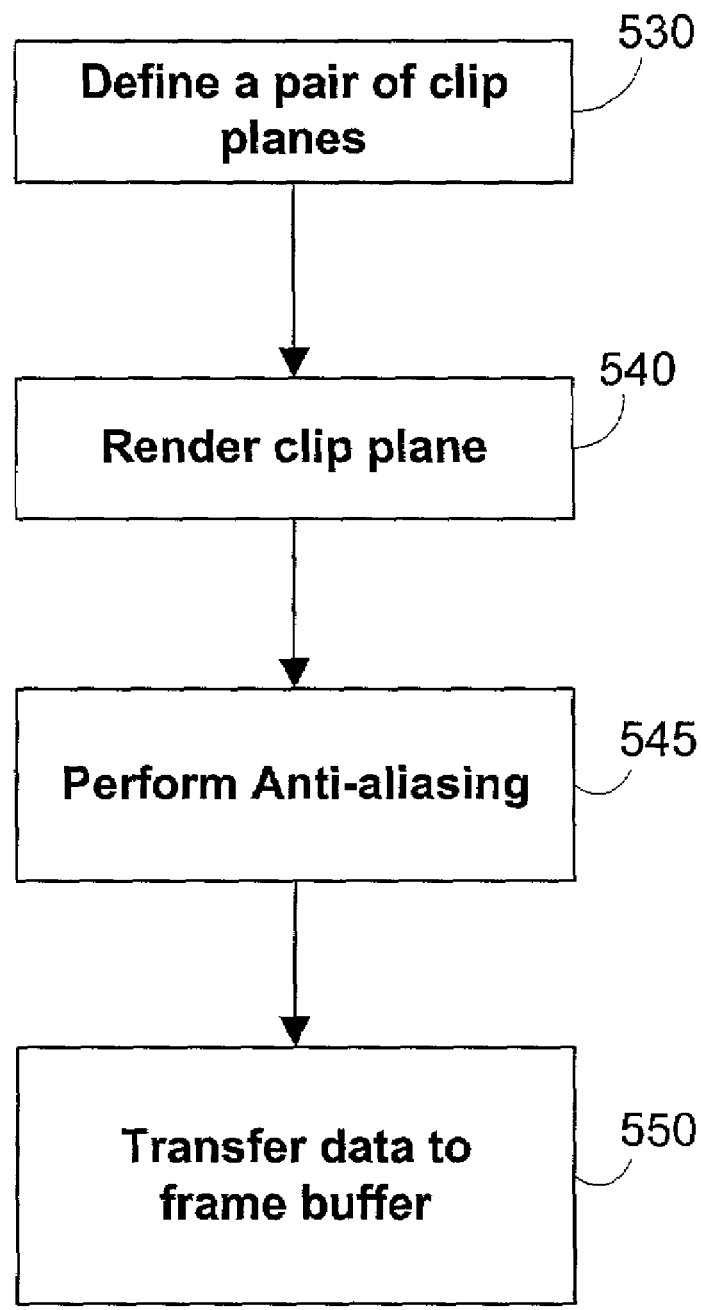
FIG. 5c is a flow diagram of another embodiment of assigning memory locations in a frame buffer according to the invention.

FIG. 5c shows a method of assigning memory locations in the multiplanar frame buffer using the multi-pass rendering technique. At step 530, a pair of software clip planes is defined. The software clip planes bound the part of the 3D scene to be displayed on a single optical element, making the rest of the 3D scene invisible. Once the clip planes are defined, the 3D scene is rendered at step 540 into a two dimensional frame buffer. At step 545, anti-aliasing is preferably performed. Anti-aliasing can be accomplished using any suitable function, such as, for example, a fog function. Such functions are described in, for example, in the '229 patent. At step 550, the rendered data is read out to the frame buffer without the need for further processing.

In certain hardware systems, multi-pass rendering of a fraction of the scene should not take much more time than single pass rendering of a whole scene. For example, 50 renderings of $1/50^{th}$ of the scene should take roughly the same amount of time as rendering the whole scene if the transfer of data from video controller 105 to the multiplanar frame buffer is sufficiently fast.

C. Direct Rasterization

In yet another embodiment of the invention, the multiplanar frame buffer may be filled using a direct rasterization technique. In some embodiments, this technique may be used in systems that include a video controller capable of generating multiplanar 3D images, as opposed to the two dimensional images generated by conventional video controllers. Accordingly, using this technique, an image may be viewed off-axis without any resultant surface breaks or loss of quality. Moreover, in a preferred embodiment, a non-conventional video controller 105 is included that incorporates a specialized rasterization processor and/or a multiplanar frame buffer. As discussed above, the multiplanar frame buffer may be divided either physically or logically, with each partition corresponding to a specific optical element.

1. Assigning Memory Locations in the Frame Buffer

Figure 5D:
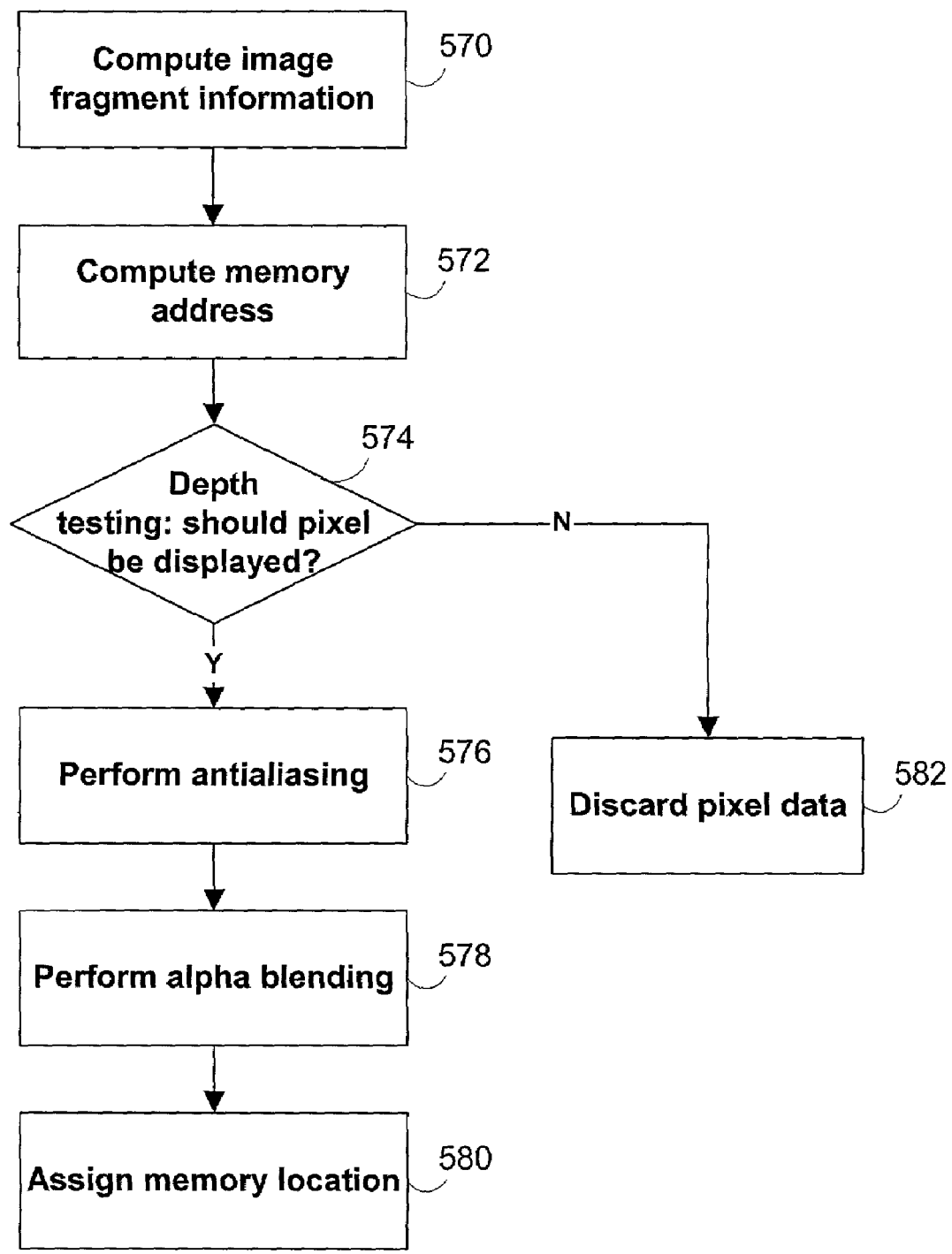
FIG. 5d is a flow diagram of a further embodiment of assigning memory locations in a frame buffer according to the invention.

FIG. 5d shows an embodiment of a direct rasterization process in accordance with the invention. At step 570, fragment information is computed. As discussed above, fragment information may include the RGB values of each pixel defined by a polygon primitive. As also discussed above, the fragment information is computed as the pixel data is being processed from the vertex information of the surface primitives. At step 572, a memory location in the multiplanar frame buffer is computed for the computed fragment. This can be accomplished in any suitable manner in which the x, y, and z coordinates are used at least in part to determine the memory address. In some embodiments, for example, where the planar resolution of the 3D image is 640 pixels by 480 pixels, the address may be calculated using either of the following equations:

$$Addr = N_{b/p} * (x640 * y + 640 * 480 * z_i)$$

$$Addr = N_{B/P} * (r * \cos(\theta) + N_r * y' + N_r * N_y * r * \sin(\theta))$$

The details of these equations are discussed above in the projection mode section.

At step 574, depth testing is performed. If a pixel is located behind (i.e., at higher z) a previously processed opaque pixel, the new pixel is not visible and the corresponding pixel data can be discarded as shown in step 582. If the pixel is not located behind an opaque pixel, the new pixel is visible and the corresponding pixel data is retained for further processing.

At step 576, antialiasing is performed on the image fragment. In an embodiment, the fractional portion of the z value is used to calculate RGB values of adjacent pixels. An example of such a function is disclosed in the '229 patent, and as discussed above. Any suitable antialiasing function, however, may be used.

Optionally, at step 578, alpha blending may be performed on the multiplanar image. Any suitable alpha blending technique may be used, such as, for example, conventional alpha blending as discussed above. Alternatively, in a multiplanar frame buffer, the brightness and/or color of pixels located behind (i.e., at the same x,y location but at a larger z) a new pixel may be modified if it can be viewed through the new foreground pixel (i.e., the new foreground pixel is translucent). For example, background pixels may have their brightness and/or color modulated depending on the alpha value of the foreground pixel.

2. Transferring Data to the Multiplanar Frame Buffer

As in projection mode, the rendered data may be processed and transferred to the display in a variety of ways, depending on the type of system and hardware being used.

Figure 6D:
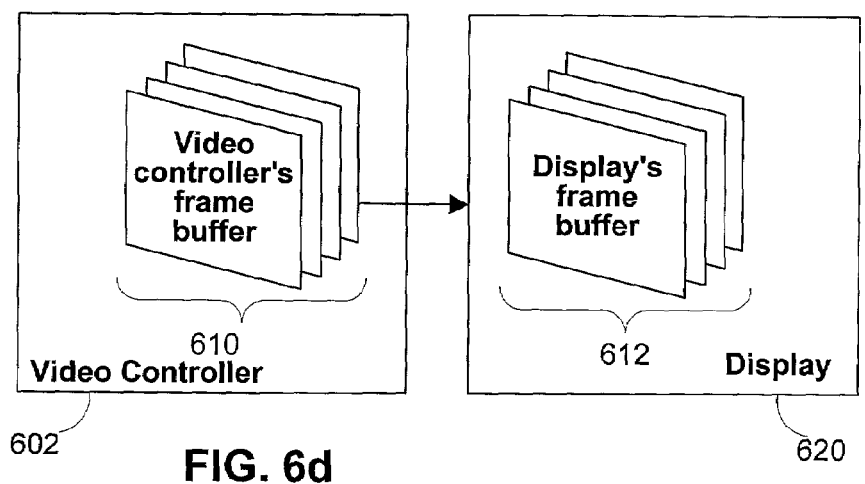

FIG. 6d illustrates a first method of transferring data to the multiplanar frame buffer. This method may be appropriate in situations where both the video controller and the display incorporate a multiplanar frame buffer. In this method, rendered and processed data may be block transferred from the multiplanar frame buffer 610 of video controller 602 to multiplanar frame buffer 612 of the display.

Figure 6E:
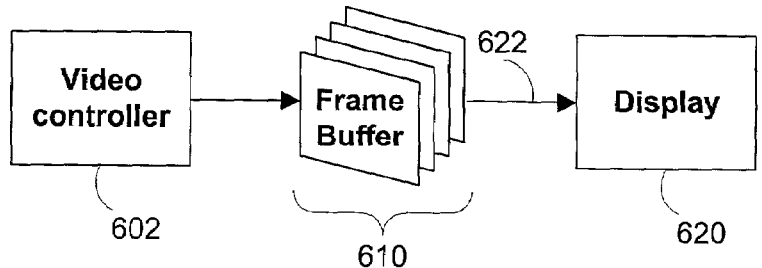

FIG. 6e illustrates another method of transferring data to the multiplanar frame buffer. This method may be appropriate in situations where display 620 does not incorporate a multiplanar frame buffer (e.g., the frame buffer is incorporated in video controller 602). In this method, the contents of multiplanar frame buffer 610 can be used to drive the display directly using a high bandwidth interface 622. The interface may be of any suitable bandwidth for transferring data such that a flicker free image is provided.

Figure 6F:
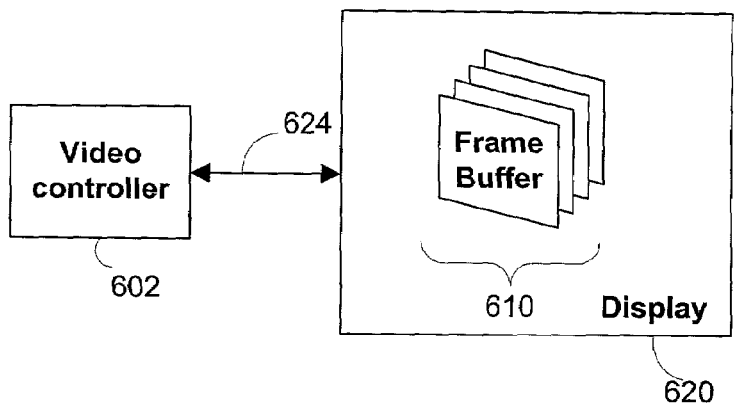

Lastly, portions of the video controller may reside on graphics source 102, while other portions reside on the display. This is illustrated in FIG. 6f. In this case, multiplanar frame buffer 610 is integrated into the display. Bidirectional address and data buses from video controller 602 may be included as part of the interface 624.

Thus, rasterization of three-dimensional images is provided. One skilled in the art will appreciate that the present invention can be practiced by other than the described embodiments, which are presented for illustration and not of limitation, and the present invention is limited only by the claims that follow.

We claim:

1. A method of processing three-dimensional image data for a three-dimensional volumetric display having a plurality of display surfaces and addressable (x,y,z) coordinates, the method comprising:

generating three-dimensional image data comprising (x,y,z) coordinate and color information, wherein the z-coordinate information represents image depth information;

assigning memory locations in a multiplanar frame buffer for the three dimensional image data in accordance with the equation:

$$Addr=N_{b/p}*(x+N_x*y+N_x*N_y*z_i);$$

providing the three-dimensional image data to the three-dimensional volumetric display based on the assigned memory locations in the multiplanar frame buffer, and displaying the three-dimensional image data wherein Addr is the assigned memory location in the multiplanar frame buffer for image data having coordinates (x,y,z), $N_{b/p}$ is the number of bytes of information stored for each pixel, $N_x$ is the number of pixels in the x direction of the three-dimensional volumetric display, $N_y$ is the number of pixels in the y dimension of the three-dimensional volumetric display, and $Z_i$ is an integer portion of the scaled z-coordinate value.

2. A method of processing three-dimensional image data for a three-dimensional volumetric display having a plurality of display surfaces and addressable (r, y' and theta) coordinates, the method comprising:

generating three-dimensional image data comprising (x,y,z) coordinate and color information, wherein the z-coordinate information represents image depth information;

assigning memory locations in a multiplanar frame buffer for the three dimensional image data in accordance with the equation:

$$Addr=N_{B/P}*(r*\text{cosine}(\text{theta})+N_r*y'+N_r*N_{y'}*r*\text{sine}(\text{theta}))$$

providing the three-dimensional image data to the three-dimensional volumetric display based on the assigned memory locations in the multiplanar frame buffer, and displaying the three-dimensional image data wherein Addr is the assigned memory location in the multiplanar frame buffer for image data having coordinates (r, y' and theta), $N_{B/P}$ is the number of bytes of information stored for each pixel, $N_r$ is the number of pixels in the r direction of the three-dimensional volumetric display, and $N_{y'}$ is the number of pixels in the y' dimension of the three-dimensional volumetric display.

3. A three dimensional image display system comprising:
a multiplanar frame buffer,
a graphics data processor for generating three-dimensional image data comprising (x,y,z) coordinate and color information, wherein the z-coordinate information represents image depth information, and for assigning memory locations in said multiplanar frame buffer for said three dimensional image data in accordance with the equation:

$$Addr=N_{b/p}*(x+N_x*y+N_x*N_y*z_i)$$

wherein Addr is said assigned memory location in said multiplanar frame buffer for image data having coordinates (x,y,z), $N_{b/p}$ is the number of bytes of information stored for each pixel, $N_x$ is the number of pixels in the x direction of said three-dimensional volumetric display, $N_y$ is the number of pixels in the y dimension of said three-dimensional volumetric display, and $z_i$ is an integer portion of the scaled z-coordinate value, and a three-dimensional volumetric display having addressable (x,y,z) coordinates and a plurality of display surfaces on which image data stored in said multiplanar frame buffer may be displayed as a plurality of pixels.

4. A three dimensional image display system comprising:
a multiplanar frame buffer,
a graphics data processor for generating three-dimensional image data comprising (x,y,z) coordinate and color information, wherein the z-coordinate information represents image depth information, and for assigning memory locations in said multiplanar frame buffer for said three dimensional image data in accordance with the equation:

$$Addr=N_{B/P}*(r*\text{cosine}(\text{theta})+N_r*y'N_r*N_{y'}*r*\text{sine}(\text{theta}))$$

wherein Addr is said assigned memory location in said multiplanar frame buffer for a pixel having coordinates (r, y' and theta), $N_{B/P}$ is the number of bytes of information stored for each pixel, $N_r$ is the number of pixels in the r direction of said three-dimensional volumetric display, and $N_{y'}$ is the number of pixels in the y' dimension of said three-dimensional volumetric display, and a three-dimensional volumetric display having addressable (r, y' and theta) coordinates and a plurality of display surfaces on which image data stored in said multiplanar frame buffer may be displayed as a plurality of pixels.

5. A method of processing three-dimensional image data for a three-dimensional volumetric display having a plurality of display surfaces, the method comprising:

generating three-dimensional image data comprising (x,y,z) coordinate, color information, transparency information, and brightness information, wherein the z-coordinate information represents image depth information;

storing the three dimensional image data at locations in a multiplanar frame buffer in accordance with the z-coordinate information;

discarding the three dimensional image data associated with a second pixel if the transparency information associated with a first pixel indicates that the first pixel is opaque, when the first pixel and the second pixel have the same (x,y) coordinate values, and the z-coordinate value associated with the second pixel indicates that the second pixel is behind the first pixel;

providing the resulting three dimensional image data to the three-dimensional volumetric display and displaying the three-dimensional image data.

6. A method of processing three-dimensional image data for a three-dimensional volumetric display having a plurality of display surfaces, the method comprising:

generating three-dimensional image data comprising (x,y,z) coordinate, color information, transparency information, and brightness information, wherein the z-coordinate information represents image depth information;

storing the three dimensional image data at locations in a multiplanar frame buffer in accordance with the z-coordinate information;

modulating the color information associated with a second pixel based on the transparency information associated with a first pixel, when the first pixel and the second pixel have the same (x,y) coordinate values, and the z-coordinate value associated with the second pixel indicates that the second pixel is behind the first pixel:

providing the resulting three dimensional image data to the three-dimensional volumetric display and displaying the three-dimensional image data.

7. A method of processing three-dimensional image data for a three-dimensional volumetric display having a plurality of display surfaces, the method comprising:

generating three-dimensional image data comprising (x,y,z) coordinate, color information, transparency information, and brightness information, wherein the z-coordinate information represents image depth information;

storing the three dimensional image data at locations in a multiplanar frame buffer in accordance with the z-coordinate information;

modulating the brightness information associated with a second pixel based on the transparency information associated with a first pixel, when the first pixel and the second pixel have the same (x,y) coordinate values, and the z-coordinate value associated with the second pixel indicates that the second pixel is behind the first pixel;

providing the resulting three dimensional image data to the three-dimensional volumetric display and displaying the three-dimensional image data.

8. A three dimensional image display system comprising:
a multiplanar frame buffer,
a graphics data processor for generating three-dimensional image data comprising (x,y,z) coordinate, color information, transparency information, and brightness information, wherein the z-coordinate information represents image depth information, for storing the three dimensional image data at memory locations in the multiplanar frame buffer in accordance with the z-coordinate information, and for discarding the three dimensional image data associated with a second pixel if the transparency information associated with a first pixel indicates that the first pixel is opaque, when the first pixel and the second pixel have the same (x,y) coordinate values, and the z-coordinate value associated with the second pixel indicates that the second pixel is behind the first pixel, and
a three-dimensional volumetric display having a plurality of display surfaces on which image data stored in said mutiplanar frame buffer may be displayed as a plurality of pixels.

9. A three dimensional image display system comprising:
a multiplanar frame buffer,
a graphics data processor for generating three-dimensional image data comprising (x,y,z) coordinate, color information, transparency information, and brightness information, wherein the z-coordinate information represents image depth information, for storing the three dimensional image data at memory locations in the multiplanar frame buffer in accordance with the z-coordinate information, and for modulating the color information associated with a second pixel based on the transparency information associated with a first pixel, when the first pixel and the second pixel have the same (x,y) coordinate values, and the z-coordinate value associated with the second pixel indicates that the second pixel is behind the first pixel, and
a three-dimensional volumetric display having a plurality of display surfaces on which image data stored in said multiplanar frame buffer may be displayed as a plurality of pixels.

10. A three dimensional image display system comprising:
a multiplanar frame buffer,
a graphics data processor for generating three-dimensional image data comprising (x,y,z) coordinate, color information, transparency information, and brightness information, wherein the z-coordinate information represents image depth information, for storing the three dimensional image data at memory locations in the multiplanar frame buffer in accordance with the z-coordinate information, and for modulating the brightness information associated with a second pixel based on the transparency information associated with a first pixel, when the first pixel and the second pixel have the same (x,y) coordinate values, and the z-coordinate value associated with the second pixel indicates that the second pixel is behind the first pixel, and
a three-dimensional volumetric display having a plurality of display surfaces on which image data stored in said multiplanar frame buffer may be displayed as a plurality of pixels.

11. A method of processing three-dimensional image data for a three-dimensional volumetric display comprising:

obtaining three-dimensional image data comprising coordinate and color information for each pixel to be displayed, wherein the coordinate information includes depth coordinate information;

computing memory addresses in a multiplanar frame buffer for the three-dimensional image data using the coordinate information and information as to pixel dimensions of the three-dimensional volumetric display, each of said memory addresses corresponding to a pixel to be displayed;

assigning the three-dimensional image data to their respective computed memory addresses in the multiplanar frame buffer, such that the three-dimensional image data for the pixels to be displayed is stored in memory locations of the multiplanar frame buffer arranged in accordance with their respective depth coordinates;

providing the three-dimensional image data to the three-dimensional volumetric display based on the assigned computed memory locations in the multiplanar frame buffer and displaying the three-dimensional image data.

12. The method of claim 11, wherein the three-dimensional volumetric display comprises a plurality of display surfaces arranged along the depth coordinate.

13. The method of claim 12 wherein said computing step comprises:

reading the depth-coordinate information;

scaling the depth-coordinate information within a range corresponding to a number of the display surfaces arranged along the depth coordinate in the three-dimensional volumetric display upon which the three-dimensional image is to be displayed; and computing the memory address in the multiplanar frame buffer for the three-dimensional image data using the coordinate information, the information as to the pixel dimensions of the three-dimensional volumetric display, and the scaled depth-coordinate information.

14. The method of claim 11 wherein the three-dimensional volumetric display has addressable (x,y,z) coordinates.

15. The method of claim 14 wherein said computing step comprises computing the memory addresses in the multiplanar frame buffer for the three-dimensional image data in accordance with the equation:

$$Addr = N_{b/p} * (x + N_x * y + N_x * N_y * z_i)$$

wherein Addr is the memory address in the multiplanar frame buffer for image data having coordinates (x,y,z), $N_{b/p}$ is the number of bytes of information stored for each pixel, $N_x$ is the number of pixels in the x direction of the three-dimensional volumetric display, $N_y$ is the number of pixels in the y dimension of the three-dimensional volumetric display, and $z_i$ is an integer portion of the scaled depth-coordinate value in the z dimension.

16. The method of claim 11 wherein the three-dimensional volumetric display has addressable (r, y' and θ) coordinates.

17. The method of claim 16 wherein the computing step comprises the step of computing memory addresses in the multiplanar frame buffer for the three-dimensional image data in accordance with the equation:

$$Addr = N_{B/P} * (r * cosine(\theta) N_r * y' + N_r * N_{y'} * r * sine(\theta))$$

wherein Addr is the memory address in the multiplanar frame buffer for image data having coordinates (r, y' and θ), $N_{B/P}$ is the number of bytes of information stored for each pixel, $N_r$ is the number of pixels in the r direction of the three-dimensional volumetric display, and $N_{y'}$ is the number of pixels in the y' dimension of the three-dimensional volumetric display.

18. The method of claim 11 wherein the assigning step comprises:

providing a first memory;

storing the three-dimensional image data in the first memory; and transferring the three-dimensional image data stored in the first memory to their respective computed memory addresses in the multiplanar frame buffer.

19. The method of claim 11, wherein the providing step comprises the step of transferring the three-dimensional image data to the three-dimensional volumetric display in accordance with the depth-coordinate information.

20. The method of claim 11 wherein the three-dimensional image data further comprises transparency information.

21. The method of claim 12 wherein the plurality of display surfaces of the three-dimensional volumetric display comprises multiple planes upon which an image is displayed.

22. The method of claim 11 wherein the three-dimensional volumetric display comprises a plurality of self-luminescent optical elements.

23. The method of claim 11 wherein the three-dimensional volumetric display is a swept-volume display.

24. The method of claim 11 wherein the obtaining step comprises generating the three-dimensional image data with a personal computer.

25. The method of claim 11 wherein the obtaining step comprises converting the three-dimensional image data into data corresponding to a plurality of two-dimensional cross-sectional images to form a three-dimensional image.

26. The method of claim 11 wherein the obtaining step comprises generating the three-dimensional image data by an application programming interface.

27. The method of claim 11 wherein the obtaining step comprises generating the three-dimensional image data from a plurality of geometric primitives.

28. The method of claim 11, wherein the assigning step comprises the step of storing the three-dimensional image data in their respective computed memory addresses in the multiplanar frame buffer.

29. The method of claim 20 further comprising the step of discarding the three-dimensional image data associated with a second pixel if the transparency information associated with a first pixel indicates that the first pixel is opaque, when the first pixel and the second pixel have the same (x,y) coordinate values, and the depth-coordinate value associated with the second pixel indicates that the second pixel is behind the first pixel, wherein the first pixel and the second pixel are associated with different computed memory addresses in the multiplanar frame buffer.

30. The method of claim 20 further comprising the step of modulating the color information associated with a second pixel based on the transparency information associated with a first pixel, when the first pixel and the second pixel have the same (x,y) coordinate values, and the depth-coordinate value associated with the second pixel indicates that the second pixel is behind the first pixel, wherein the first pixel and the second pixel are associated with different computed memory addresses in the multiplanar frame buffer.

31. The method of claim 12 wherein the assigning step comprises the step of assigning the three-dimensional image data to be displayed on the same display surface to the memory addresses within one common physical partition of the multiplanar frame buffer.

32. The method of claim 12 wherein the assigning step comprises the step of assigning the three-dimensional image data to be displayed on the same display surface to the memory addresses within one common logical partition of the multiplanar frame buffer.

33. The method of claim 11, wherein the multiplanar frame buffer is located in the three-dimensional volumetric display.

34. The method of claim 18, wherein the first memory comprises a multiplanar frame buffer.

35. The method of claim 11, further comprising the step of processing the three-dimensional image data.

36. The method of claim 35, wherein the processing step comprises performing depth testing.

37. The method of claim 35, wherein the processing step comprises performing multiplanar antialiasing.

38. The method of claim 35, wherein the processing step comprises performing alpha blending.

39. A three-dimensional image display system for displaying a three-dimensional image on a three-dimensional volumetric display, comprising:
   a multiplanar frame buffer for storing three-dimensional image data, and
   a graphics data processor for (1) receiving the three-dimensional image data comprising coordinate and color information for each pixel to be displayed, wherein the coordinate information includes depth coordinate information, (2) computing memory addresses in the multiplanar frame buffer for the three-dimensional image data using the coordinate information and information as to pixel dimensions of the three-dimensional volumetric display, each of said memory addresses corresponding to a pixel to be displayed, and (3) assigning the three-dimensional image data to their respective computed memory addresses in the multiplanar frame buffer, such that the three-dimensional image data for the pixels to be displayed is stored in memory locations of the multiplanar frame buffer arranged in accordance with their respective depth coordinates.

40. The three-dimensional image display system of claim 39, wherein the three-dimensional volumetric display comprises a plurality of display surfaces arranged along the depth coordinate.

41. The three-dimensional image display system of claim 40 wherein the graphics data processor
   reads the depth-coordinate information;
   scales the depth-coordinate information within a range corresponding to a number of the display surfaces arranged along the depth coordinate in the three-dimensional volumetric display upon which the three-dimensional image is to be displayed; and
   computes the memory addresses in the multiplanar frame buffer for the three-dimensional image data using the coordinate information, the information as to the pixel dimensions of the three-dimensional volumetric display, and the scaled depth-coordinate information.

42. The three-dimensional image display system of claim 39 wherein the three-dimensional volumetric display has addressable (x,y,z) coordinates.

43. The three-dimensional image display system of claim 42 wherein the graphics data processor further computes the memory addresses in the multiplanar frame buffer for the three-dimensional image data in accordance with the equation:

$$\text{Addr}=N_{b/p}*(x+N_x*y+N_x*N_y*z_i)$$

wherein Addr is the memory address in the multiplanar frame buffer for image data having coordinates (x,y,z), $N_{b/p}$ is the number of bytes of information stored for each pixel, $N_x$ is the number of pixels in the x direction of the three-dimensional volumetric display, $N_y$ is the number of pixels in the y dimension of the three-dimensional volumetric display, and $z_i$ is an integer portion of the scaled depth-coordinate value in z dimension.

44. The three-dimensional image display system of claim 39 wherein the three-dimensional volumetric display has addressable (r, y' and θ) coordinates.

45. The three-dimensional image display system of claim 44 wherein the graphics data processor further computes the memory addresses in the multiplanar frame buffer for the three-dimensional image data in accordance with the equation:

$$\text{Addr}=N_{B/P}*(r*\cosine(\theta)+N_r*y'+N_r*N_{y'}*r*\sine(\theta))$$

wherein Addr is the memory addresses in the multiplanar frame buffer for image data having coordinates (r, y' and θ), $N_{B/P}$ is the number of bytes of information stored for each pixel, $N_r$ is the number of pixels in the r direction of the three-dimensional volumetric display, and $N_{y'}$ is the number of pixels in the y' dimension of the three-dimensional volumetric display.

46. The three-dimensional image display system of claim 39 further including a first memory, wherein the graphics data processor further
   stores the three-dimensional image data in the first memory; and
   transfers the three-dimensional image data stored in the first memory to their respective computed memory addresses in the multiplanar frame buffer.

47. The three-dimensional image display system of claim 39 wherein the graphics data processor further transfers the three-dimensional image data to the three-dimensional volumetric display in accordance with the depth-coordinate information.

48. The three-dimensional image display system of claim 39 wherein the three-dimensional image data further comprises transparency information.

49. The three-dimensional image display system of claim 47 wherein the graphics data processor further displays an image on the three-dimensional volumetric display.

50. The three-dimensional image display system of claim 40 wherein the plurality of display surfaces of the three-dimensional volumetric display comprises multiple planes upon which an image is displayed.

51. The three-dimensional image display system of claim 39 wherein the three-dimensional volumetric display comprises a plurality of self-luminescent optical elements.

52. The three-dimensional image display system of claim 39 wherein the three-dimensional volumetric display is a swept-volume display.

53. The three-dimensional image display system of claim 39 wherein the graphics data processor further generates the three-dimensional image data with a personal computer.

54. The three-dimensional image display system of claim 39 wherein the graphics data processor further converts the three-dimensional image data into data corresponding to a plurality of two-dimensional cross-sectional images that form the three-dimensional image.

55. The three-dimensional image display system of claim 39 wherein the graphics data processor further generates the three-dimensional image data by an application programming interface.

56. The three-dimensional image display system of claim 39 wherein the graphics data processor further generates the three-dimensional image data from a plurality of geometric primitives.

57. The three-dimensional image display system of claim 48, wherein the graphics data processor is further designed to discard the three-dimensional image data associated with a second pixel if the transparency information associated with a first pixel indicates that the first pixel is opaque, when the first pixel and the second pixel have the same (x,y) coordinate values, and the depth-coordinate value associated with the second pixel indicates that the second pixel is behind the first pixel, wherein the first pixel and the second pixel are associated with different computed memory addresses in the multiplanar frame buffer.

58. The three-dimensional image display system of claim 48, wherein the graphics data processor modulates the color information associated with a second pixel based on the transparency information associated with a first pixel, when the first pixel and the second pixel have the same (x,y) coordinate values, and the depth-coordinate value associated with the second pixel indicates that the second pixel is behind the first pixel, wherein the first pixel and the second pixel are associated with different computed memory addresses in the multiplanar frame buffer.

59. The three-dimensional image display system of claim 40 wherein the graphics data processor further assigns the three-dimensional image data to be displayed on the same display surface to the memory addresses within one common physical partition of the multiplanar frame buffer.

60. The three-dimensional image display system of claim 40 wherein the graphics data processor further assigns the three-dimensional image data to be displayed on the same display surface to the memory addresses within one common logical partition of the multiplanar frame buffer.

61. The three-dimensional image display system of claim 39, wherein the multiplanar frame buffer is located in the three-dimensional volumetric display.

62. The three-dimensional image display system of claim 46, wherein the first memory comprises a multiplanar frame buffer.

63. The three-dimensional image display system of claim 39, wherein the graphics data processor processes the three-dimensional image data prior to assigning the three-dimensional image data to their respective computed memory addresses in the multiplanar frame buffer.

64. The three-dimensional image display system of claim 63, wherein the graphics data processor processes the three-dimensional image data by performing depth testing.

65. The three-dimensional image display system of claim 63, wherein the graphics data processor processes the three-dimensional image data by performing multiplanar antialiasing.

66. The three-dimensional image display system of claim 63, wherein the graphics data processor processes the three-dimensional image data by performing alpha blending.

67. The three-dimensional image display system of claim 39, further comprising the three-dimensional volumetric display.

* * * * *